(12) United States Patent
Frolov

(10) Patent No.: US 8,418,591 B2
(45) Date of Patent: Apr. 16, 2013

(54) POWER TABLE SAW WITH EXTENSION TABLE

(75) Inventor: Andrew Frolov, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 471 days.

(21) Appl. No.: 12/509,040

(22) Filed: Jul. 24, 2009

(65) Prior Publication Data
US 2011/0017041 A1    Jan. 27, 2011

(51) Int. Cl.
*B25H 1/02* (2006.01)
(52) U.S. Cl.
USPC ......................................... 83/477.2; 144/287
(58) Field of Classification Search ................ 83/477.2, 83/859; 144/287, 286.1, 286.5; 248/136
See application file for complete search history.

(56) References Cited

U.S. PATENT DOCUMENTS

| | | | |
|---|---|---|---|
| 2,722,243 A | | 5/1954 | Nagy |
| 3,429,347 A | * | 2/1969 | Klein .......................... 83/435.27 |
| 3,931,751 A | * | 1/1976 | Simonson ........................ 83/859 |
| 4,068,551 A | | 1/1978 | Kreitz |
| 4,640,326 A | | 2/1987 | Hewitt |
| 5,004,029 A | * | 4/1991 | Garner .......................... 144/287 |
| 5,255,724 A | * | 10/1993 | Butke ............................ 144/329 |
| 5,379,816 A | | 1/1995 | Charlton |
| 5,462,102 A | | 10/1995 | Searfoss |
| 5,518,053 A | * | 5/1996 | Robison ..................... 144/286.1 |
| 5,857,507 A | * | 1/1999 | Puzio et al. .................... 144/287 |
| 6,668,696 B1 | | 12/2003 | Krohmer et al. |
| 6,948,539 B1 | | 9/2005 | Barker et al. |
| 2003/0075033 A1 | | 4/2003 | Speakman |
| 2010/0276910 A1 | * | 11/2010 | Wise ............................. 280/651 |

FOREIGN PATENT DOCUMENTS

| | | |
|---|---|---|
| CA | 2 448 446 | 3/2005 |
| DE | 20 2008 011 969 | 1/2009 |

OTHER PUBLICATIONS

European Search Report issued in related European Application No. 10170612.5 on Aug. 19, 2011.

* cited by examiner

*Primary Examiner* — Stephen Choi
(74) *Attorney, Agent, or Firm* — Maginot, Moore & Beck

(57) ABSTRACT

Embodiments are disclosed for a power table saw assembly that comprises a frame configured to retain a motor assembly for driving a rotatable blade, a table top assembly having a top surface with an opening through which a rotating blade can extend provided on the frame, and a base for supporting the frame thereon. A foldable extension table is pivotally connected to an axle fixedly provided in the base, for supporting a workpiece. The extension table is configured to be folded and pivoted about the axle to be stored within the base when the extension table is not in use. In one embodiment, the axle is provided in the rear of the base and generally perpendicular to the blade, so that the extension table can support a workpiece from the table top downstream of the blade. In another embodiment, the axle is provides on one side of the base and generally parallel to the blade, so that the extension table can support a workpiece that extends beyond the table top to one side of the blade.

22 Claims, 6 Drawing Sheets

POWER TABLE SAW WITH EXTENSION TABLE

BACKGROUND OF THE INVENTION

The present invention generally relates to power table saws, and particularly, portable power table saws.

Artisans or craftsmen that use portable table saws often bring their table saws on site to make cuts that are necessary as a part of their construction work. The portable table saw are typically transported on a truck bed, and accordingly, it is essential that the portable table saws be lightweight and occupy minimum space on the truck. At times, the portable table saws are used to cut long or wide workpieces, requiring the use of a separate support table or an extension table attached to the portable saws. A separate support table requires one more pieces of equipment to be transported to the work site, and the attached extension table makes it difficult to transport the portable table saws.

SUMMARY OF THE INVENTION

Embodiments are disclosed for a power table saw assembly that comprises a frame configured to retain a motor assembly for driving a rotatable blade, a table top assembly having a top surface with an opening through which a rotating blade can extend provided on the frame, and a base for supporting the frame thereon. A foldable extension table is pivotally connected to an axle fixedly provided in the base, for supporting a workpiece. The extension table is configured to be folded and pivoted about the axle to be stored within the base when the extension table is not in use.

In one embodiment, the axle is provided in the rear of the base and generally perpendicular to the blade, so that the extension table can support a workpiece from the table top downstream of the blade. In another embodiment, the axle is provided on one side of the base and generally parallel to the blade, so that the extension table can support a workpiece that extends beyond the table top to one side of the blade.

DETAILED DESCRIPTION

Figure 1:
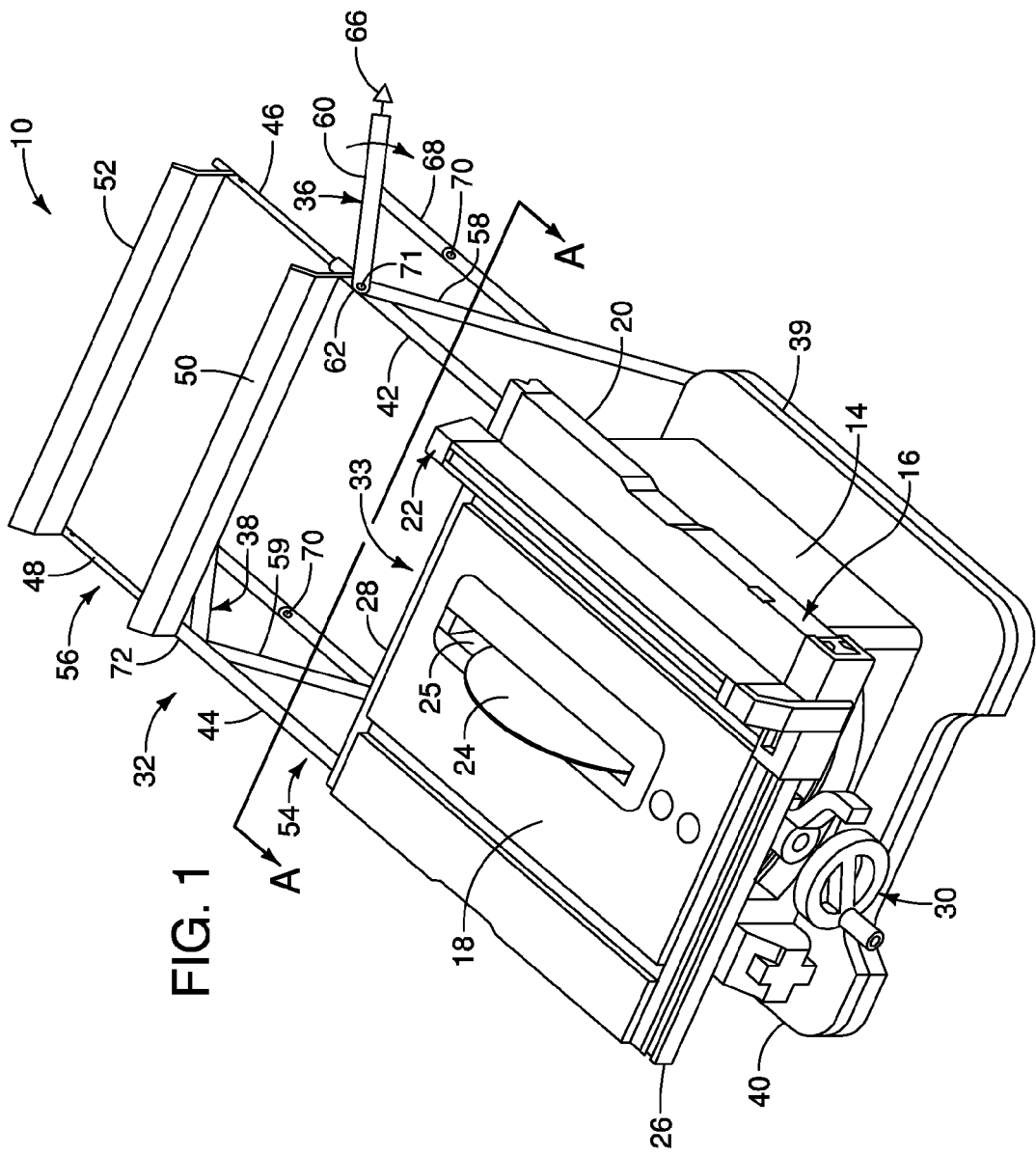
FIG. 1 is an upper right front perspective view of a power table saw assembly having a foldable extension table in operation position in accordance with an embodiment of the present invention.

The preferred embodiment of the invention is directed to a portable table saw which has an extension table assembly configured and arranged to be attached to the rear of the table saw for supporting long workpieces or to the side of the table saw for supporting wide workpieces. The extension table assembly has a foldable construction to occupy minimum space for easy transportation and so that it stays within the saw footprint. The extension table has one or more stages of extension to support the workpiece and has additional legs for better stability. When not in use, the extension table gets folded and secured under the saw base in a locked position. The present invention does not require a separate support table to be transported to the work site and allows for easier transportation than portable table saws with an extension table that cannot be folded.

Embodiments of the present invention are shown in the drawings, with one embodiment being shown in FIGS. 1-4, wherein a power table saw assembly, indicated generally at 10, is illustrated and has a base 12, a frame structure 14, and a table top indicated generally at 16. The table top 16 has top surface 18 and a bottom surface 20. The saw assembly also includes a rip fence, indicated generally at 22 and a blade 24 extending partially through an opening 25 in the top surface 18 of the table top 16. A front rail 26 and a rear rail 28 are provided at the front and rear sides of the table top 16 to allow the rip fence 22 to be moved along the rails. The saw assembly 10 is a portable table saw that has a bevel and blade height adjust mechanism, indicated generally at 30.

Figure 2:
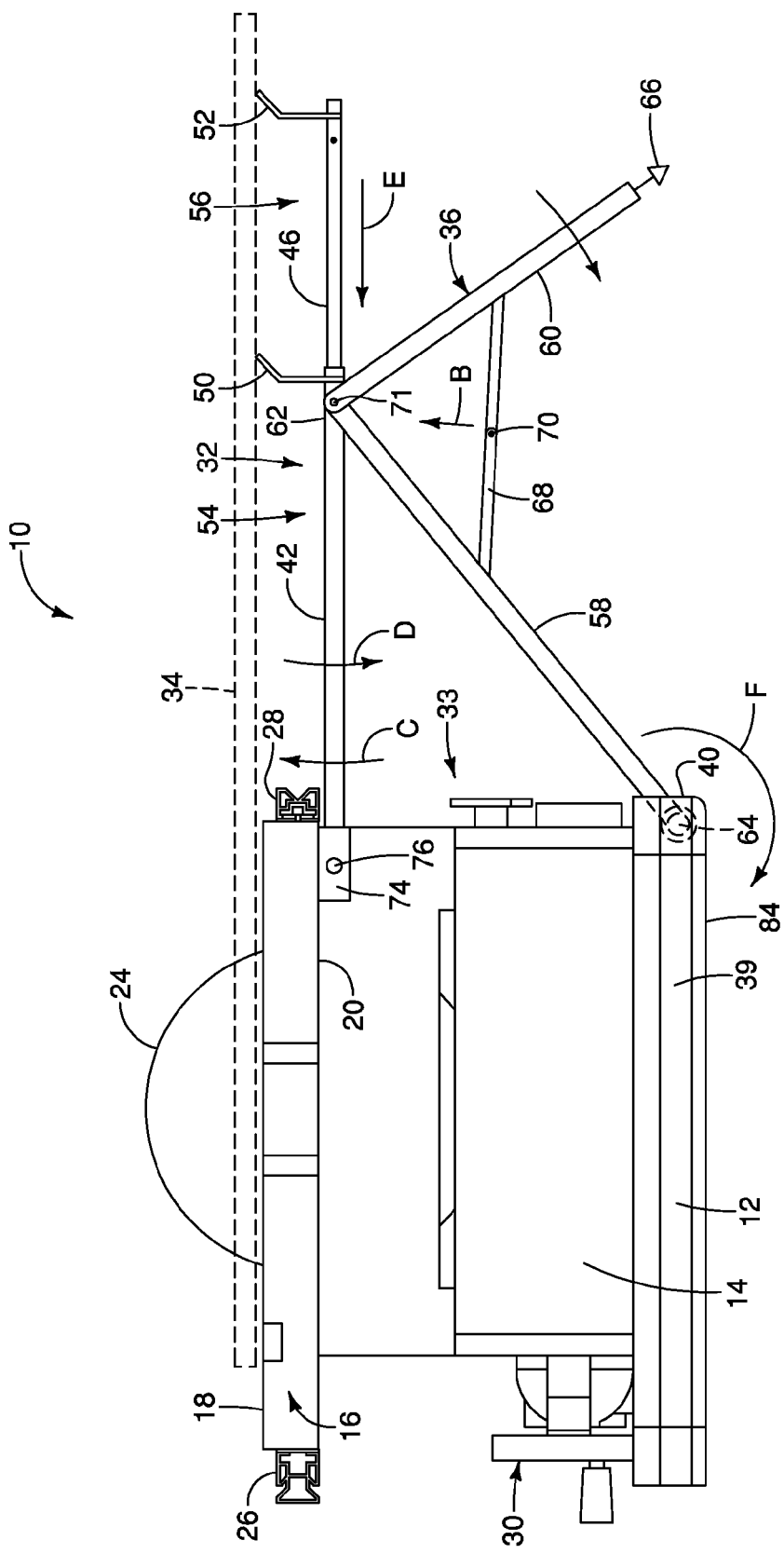
FIG. 2 is a side view of the power table saw shown in FIG. 1.

The saw assembly 10 also includes an extension table assembly, indicated generally at 32, attached to the table top 16 and the base 12 at the rear 33 of the saw assembly, downstream of the saw blade 24, for supporting long workpieces 34 that extend past the table top 16 (shown in phantom in FIG. 2). The extension table assembly 32 includes a pair of right and left frames, indicated generally at 36 and 38, which are secured to the base 12 right and left sides 39, 40 of the base at the rear 33 of the saw assembly 10. The frames 36, 38 are configured to respectively support elongated right and left arms 42 and 44 extending from and removably attached to the bottom surface 20 of the table top 16 towards the rear 33 of the saw assembly 10. The table assembly 32 also includes extension rods 46, 48 which extend from the ends of the arms 42, 44, respectively, and a horizontal material support 50 having opposite ends secured to the ends of the arms 42, 44. A horizontal material support 52 has opposite ends attached to the ends of the rods 46, 48. The arms 42, 44 and the material support 50 combine to form a first stage support 54, and the rods 46, 48 and the material support 52 combine to form a second stage support 56.

The arms 42, 44 are preferably made of steel or aluminum and formed into a tube which is sized to cooperatively receive the rods 46, 48 therein. The length of the arms 42, 44 are approximately the same as that of the rods 46, 48, so as to enable the rods to be retracted almost entirely within the arms. When the rods 46, 48 are fully retracted within the arms 42, 44, the material support 52 is matingly received by the material support 50 attached to the arms. The rods 46, 48 are also preferably made of steel or aluminum.

The material supports 50, 52 are attached to the ends of the arms 42, 44 and the rods 46, 48 in any known manner. In the preferred embodiment, the material supports 50, 52 are bent slightly away from the table top 16 so that the workpiece 34 does not get caught by the material supports. It is contemplated that the material support can take on any shape that are known for purposes of supporting workpieces. However, the height of the material support should be such that it is generally similar to that of the top surface 18 of the table top 16. The material supports 50, 52 are also preferably made of steel or aluminum, or other substantially rigid material such as plastic.

The frames 36, 38 each include an upper leg 58 and a lower leg 60, which are pivotally connected to each other at a connection joint 62. The upper leg 58 is pivotally connected at the opposite end from the connection joint 62 to an axle 64 in the base 12 (best shown in FIG. 4). The lower leg 60 is provided with a foot 66 at the end opposite the connection joint 62. The foot 66 is threaded into the ends of the lower leg 60 so as to allow the frames 36, 38 to be raised or lowered.

The frames 36, 38 also include a securing element 68 which includes a pivot point 70 and two ends that are attached to the upper and lower legs 58, 60 about their mid point, forming a generally A-shaped configuration. The securing element 68 pivots about at the point 70 so that when the securing element 68 is pushed upward and at the pivot point, as indicated by the arrow B (shown in FIG. 2), the two ends of the securing element are brought closer together, thereby bringing the upper and lower legs 58, 60 together. Since the end of the upper leg 58 opposite the connection point 62 is secured to the pivot axle 64, folding the securing element 68 results in the lower leg 60 being pivoted about the joint 62 and brought along side upper leg 58. The upper and lower legs 58, 60 may also be made of aluminum in the shape of a circular tube. However, the upper and lower legs 58, 60 may be formed into any cross section, such as square or inverted U shape, for example. The securing element 68 is also preferably made of steel or aluminum, and have a tubular cross section or a flat bar. Any other shape known for this intended purpose may also be used.

The support arms 42, 44 near their distal ends are pivotally connected to the upper and lower legs 58, 60 of the frames 36, 38 at the connection joints 62. A removable pin runs 71 through the right support arm 42 and its corresponding upper and lower legs 58, 60 and another removable pin 72 runs through the left support arm 44 and its corresponding upper and lower legs 58, 60 to keep these components together at the connection joints 62. At the opposite ends, the support arms 42, 44 are releasably secured to a pair of support brackets 74 which are secured to the bottom surface 20 of the table top 16, generally above the axle 64 near the right and left sides 39, 40 of the base 12 (best shown in FIGS. 2 and 3). Each of the support arms 42, 44 are received within the brackets 74 and secured in place by bracket pins 76, which extends through the bracket 74 and through an aperture in each of the arms 42, 44.

Figure 3:
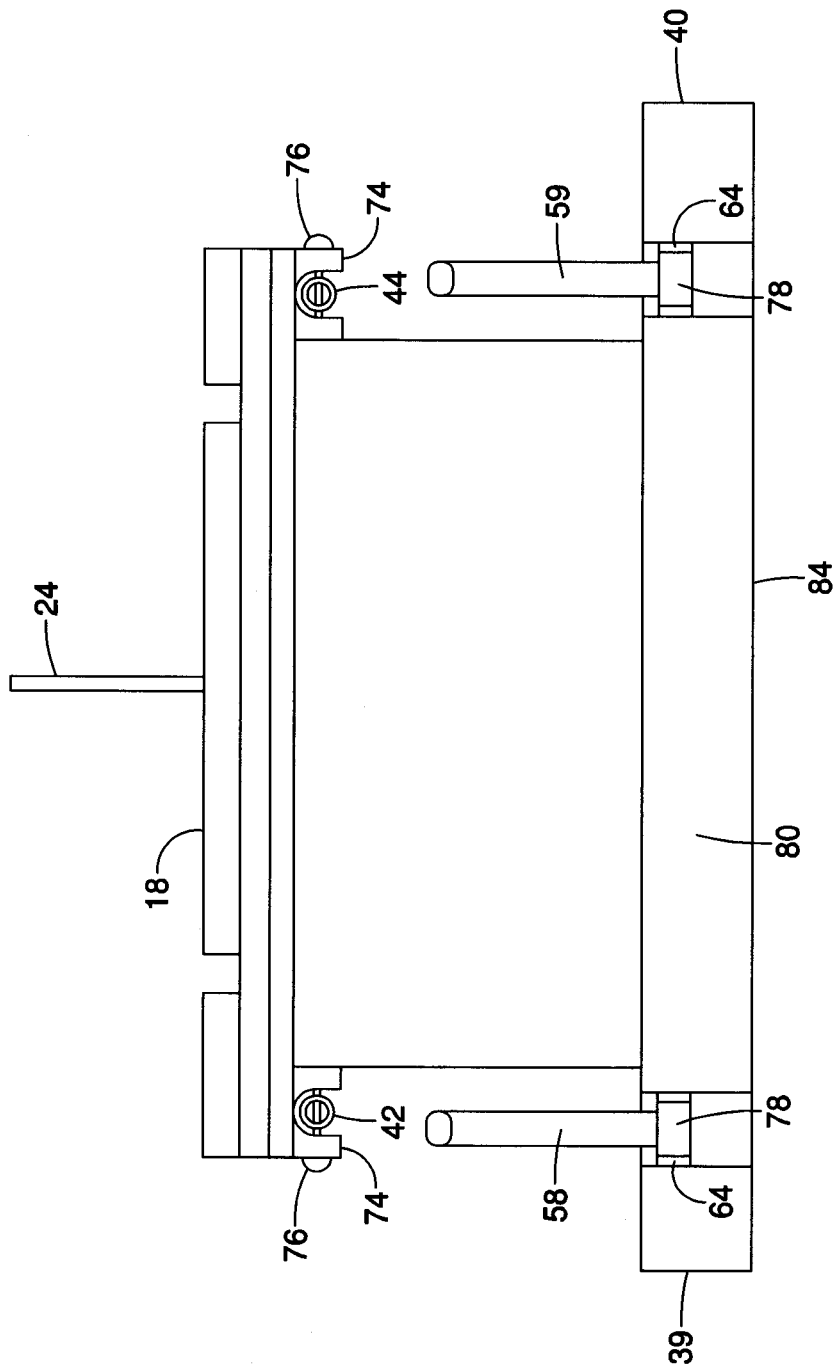
FIG. 3 is a rear view of the embodiment of the present invention shown in FIG. 1, along line A-A.

As shown in FIG. 3, the support brackets 74 are in the shape of a half cylinder (best shown in FIG. 3) so that the support arms 42, 44 can be easily and quickly seated in the brackets 74. Since the distal end of the arms 42, 44 are connected to the frames 36, 38 at the connection joint 62, the opposite ends of the arms 42, 44 are received readily in the brackets 74 when the arms are lifted towards the brackets in the direction indicated by arrow C (shown in FIG. 2). To disengage the support arms 42, 44 from the brackets 74, the bracket pins 76 are removed and the arms are allowed to pivot about the joint 62 and swing out of the brackets in the direction shown by the arrow D.

Figure 4:
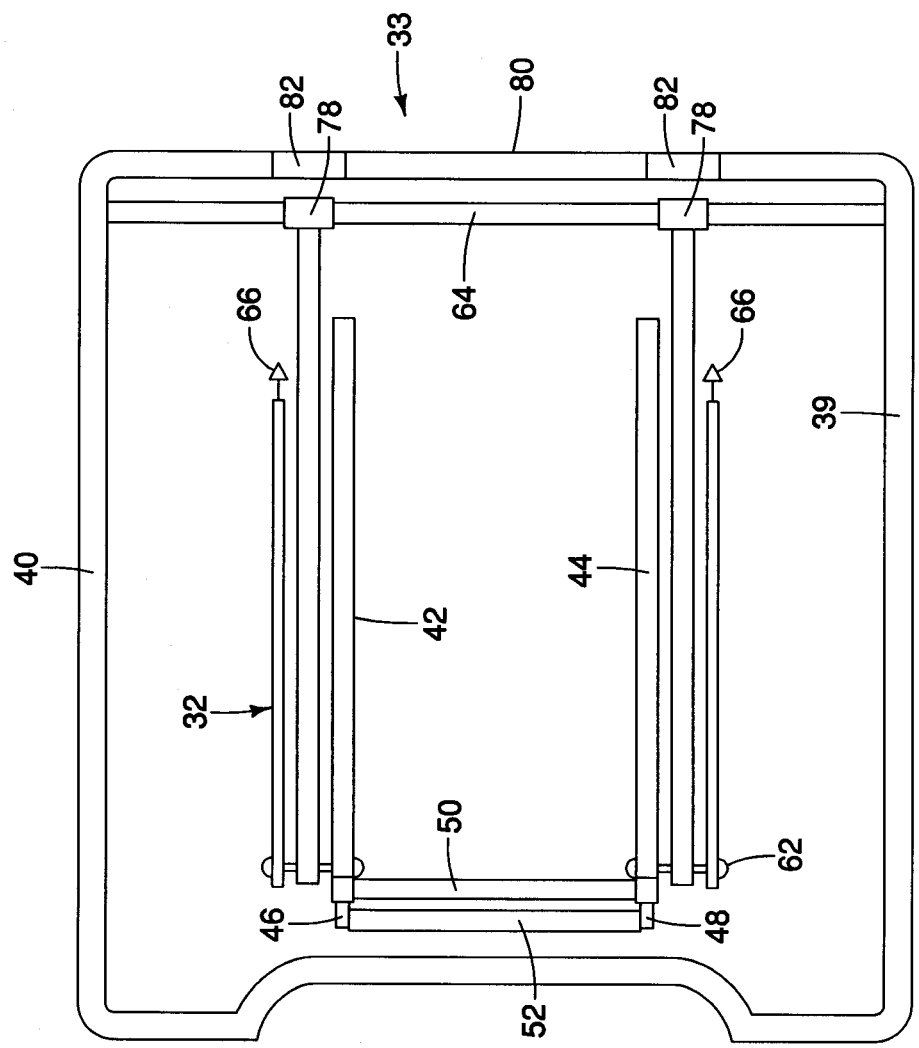
FIG. 4 is a bottom plan view of the power table saw shown in FIG. 1, with the extension table in a stored position.

As previously mentioned, the upper legs 58 at the end opposite the joint 62 are pivotally connected to the axle 64, which is secured to the right and left sides 39, 40 of the base 12 at the rear 33 of the saw assembly 10 (best shown in FIG. 4). The axle 64 is preferably made of steel or aluminum and welded or anchored to the sides 39, 40 by any known manner so that it is firmly secured. The upper legs 58 are pivotally connected to the axle 64 using collars 78 which is coaxial with the axle to enable the upper legs 58 to pivot about the axle. To allow the upper legs 58 to be connected to the axle 64, a rear side 80 of the base 12 is provided within an openings 82 that enable the upper legs to be placed in an angle to support the arms 42, 44 when the arms are attached in the brackets 74. The openings 82 also enable the upper legs 58 to be freely pivoted from approximately 90 degrees to minus 180 degrees relative to the bottom 84 of the base 12.

FIGS. 1 and 2 show the table saw assembly 10 with the extension table assembly 32 in a fully extended position for receiving a long workpiece from the top surface 18 of the table top 16. As the workpiece comes off the top surface 18, it rest first on the material support 50 in the first stage 54, and then on the material support 52 in the second stage 56, if the work piece is sufficiently long, thereby supporting the workpiece to provide the user better control and preventing the workpiece from falling off the table top 16. When the extension table assembly 10 is not needed or to prepare it for transport, it is folded and stored within the base 12 of the saw assembly, entirely within the footprint of the saw, as shown in FIG. 4.

More specifically, the extension table assembly 32 is folded and stored by retrieving the rods 46, 48 within the support arms 42, 44 in the direction indicated by arrow E, so that the material support 50 in the first stage 54 and the material support 52 in the second support stage 56 are brought together. Then the lower legs 60 are brought together generally parallel with the upper legs 58 by moving the pivot points 70 in an upward direction as indicated by arrow B. The support arms 42, 44 are then released from the support brackets 74 by removing the pins 76, and allowing the arms to pivot about the joint 62 to be brought generally parallel with the corresponding upper legs 58. To store the extension table assembly 32 within the base 12, it is pivoted about the axle 64 in the direction indicated by arrow F until it is housed entirely within the sides of the base 12. The extension table assembly 32 in a stored position is shown in FIG. 4. Although not shown, the extension table assembly 32 is held or locked in the base 12 by a locking mechanism such as, for example, a strap having a button or Velcro®, a belt, clip or a C clamp.

Figure 5:
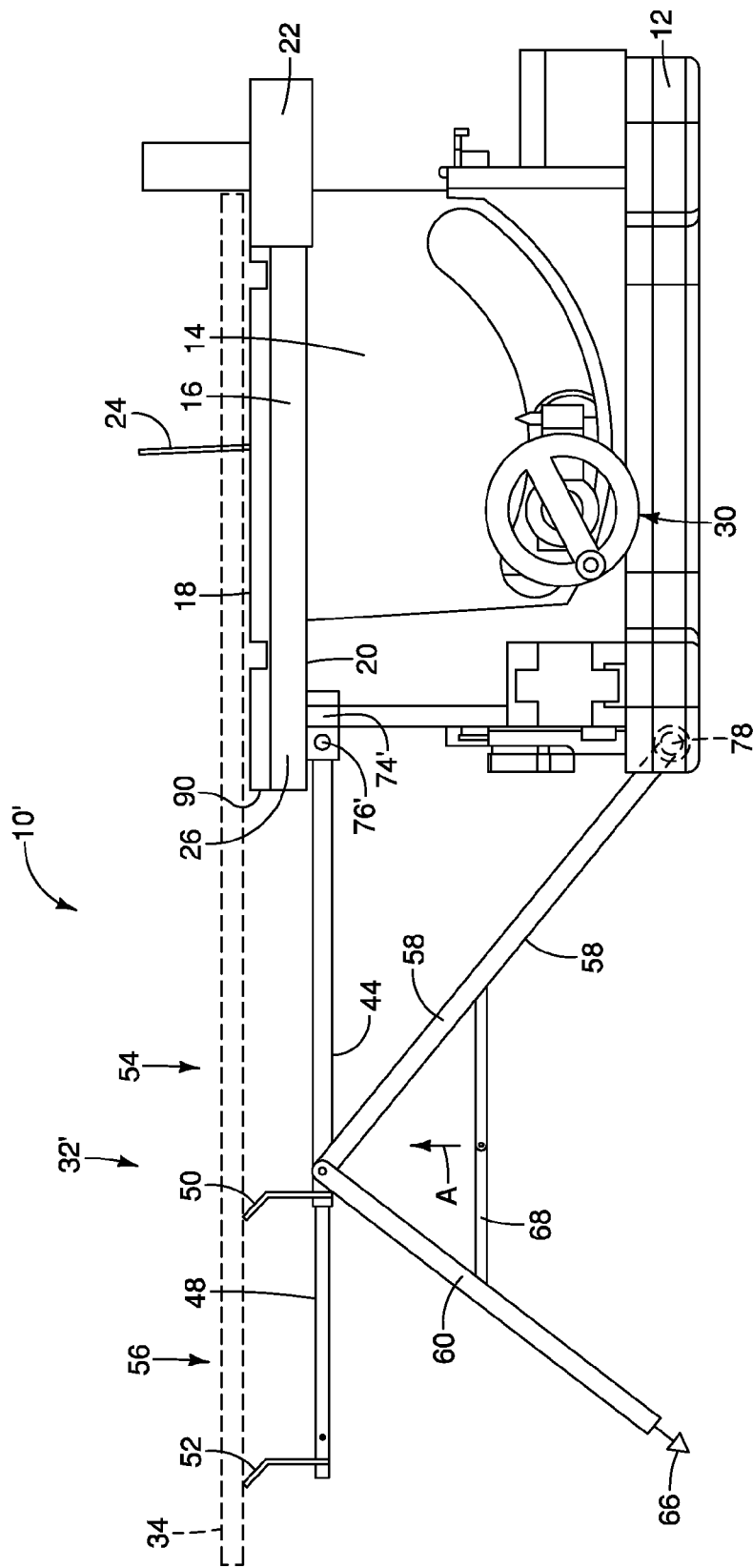
FIG. 5 is a front view of an alternate embodiment of the power table saw having a foldable extension table in operation position.
Figure 6:
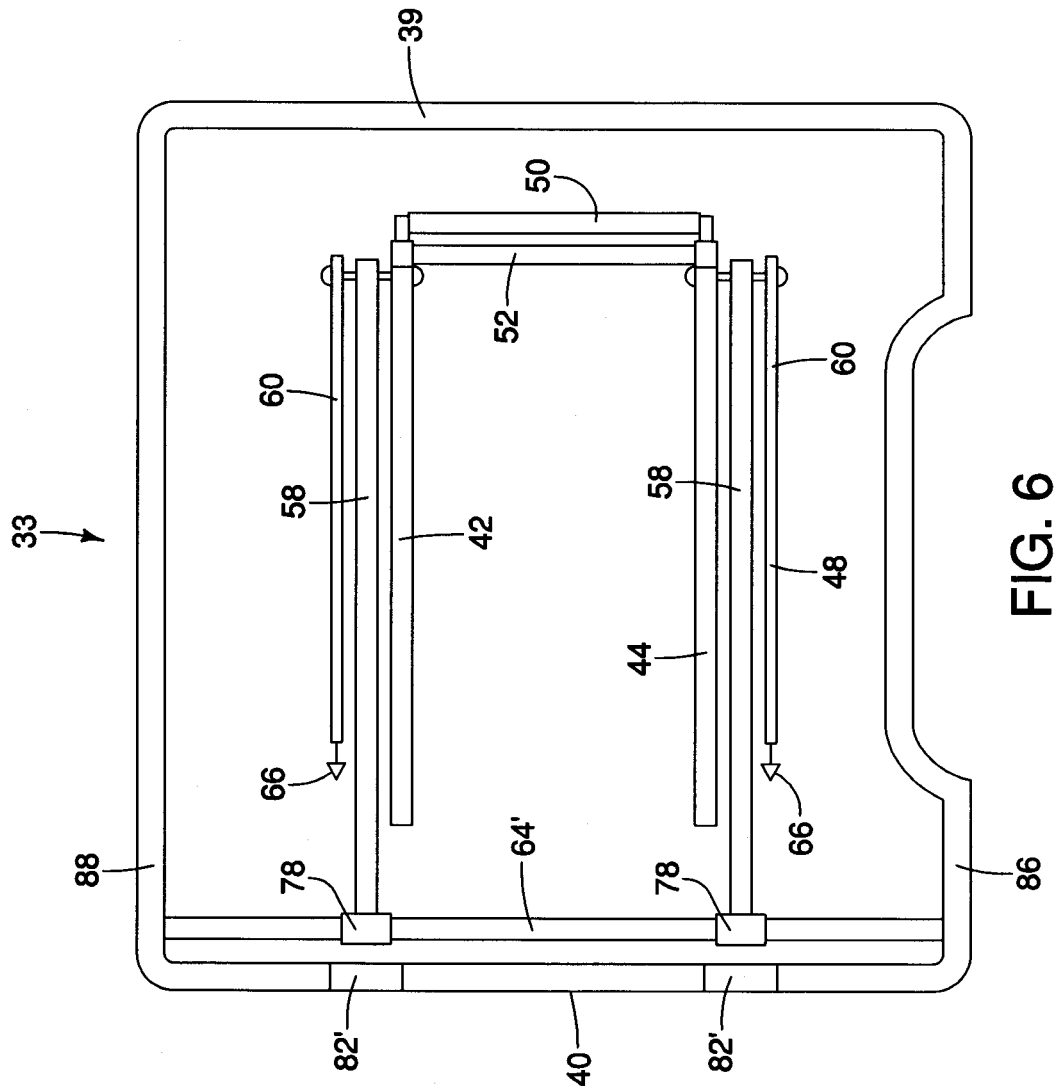
FIG. 6 is a bottom plan view of the alternate embodiment shown in FIG. 5, with the extension table in a stored position.

An alternative embodiment of the power saw assembly 10' is shown in FIGS. 5 and 6, which illustrate components that have similar shapes as having the same reference numbers and a prime designation. Thus, the above description with regard to the power table saw assembly 10 including the extension table assembly 32 have applicability to the alternative embodiment. The primary difference between the first embodiment shown in FIGS. 1-4 and the alternative embodiment is that the extension table assembly 32 of the previously described embodiment acts as a rear outfeed support for long workpieces. The extension table assembly 32', in contrast, acts as a side support for wide workpieces. Accordingly, the extension table assembly 32' is configured to be provided to the left side of the blade 24, opposite the rip fence 22. The upper legs 58 are pivotally connected to an axle 64' which is attached to the front side 86 and the rear side 88 of the base 12 at its opposite ends, generally near and parallel with the left side 40 of the base. The collar 78 is used for connecting the upper legs 58 to the axle 64'. To enable the upper legs 58 to be pivoted in and out of the base 12, an opening 82' is provided on the left side 40 of the base. When the extension table assembly 32' is in an extended position, the support arms 42, 44 are received in brackets 74' which are mounted on the bottom surface 20 of the table top 16 on opposite sides of the frame 14 at the left side 90 of the table top 16. The pins 76' keep the arms 42 and 44 locked in the brackets 74'. When not in use, the extension table assembly 32' is folded as described above with respect to the previous embodiment of the extension table assembly 32 and stored within the base 12, as shown in FIG. 6.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power table saw assembly comprising:
   a motor assembly for driving a rotatable blade;
   a frame configured to house said motor assembly therein;
   a table top assembly provided on a top of said frame having a top surface with an opening through which said rotatable blade can extend;
   a base provided on a bottom of said frame opposite said table top for supporting said frame on a top side of said base;
   a pair of brackets provided on opposing sides of said frame underneath said table top assembly;
   a connection mechanism fixedly secured to said base on a bottom side of said base opposite said top side; and
   a foldable extension table pivotally connected to said connection mechanism and detachably connected to said brackets underneath said table top, for supporting a workpiece thereon;
   wherein said extension table is configured to be detached from said brackets, folded and pivoted about said connection mechanism to be stored on the bottom side, below said base,
   wherein said extension table comprises:
      a first support arm having a first end configured to be removably attached to one of said brackets and a second end pivotally connected to a first connection joint provided on a first support frame;
      a second support arm spaced from said first support arm and having a first end configured to be removably attached to the other one of said brackets and a second end pivotally connected to a second connection joint provided on a second support frame; and
      an elongated first material support attached proximate said second ends of, and extending between, said first and second support arms, for supporting a workpiece that extends past said table top downstream of said blade;
   wherein said first support frame comprises:
      a first upper leg having a first end pivotally connected to said axle provided in said base and a second end pivotally connected to said first support arm at said first connection joint;
      a first lower leg having a first end pivotally connected to said first support arm and said first upper leg at said first connection joint; and
      a first securing mechanism connected to said first upper leg and said first lower leg for releasably locking the first lower leg at a fixed angle with respect to said first upper leg; and
   wherein said second support frame comprises:
      a second upper leg having a first end pivotally connected to said axle provided in said base and a second end pivotally connected to said second support arm at said second connection joint;
      a second lower leg having a first end pivotally connected to said second support arm and said second upper leg at said second connection joint; and
      a second securing mechanism connected to said second upper leg and said second lower leg for releasably locking the second lower leg at a fixed angle with respect to said second upper leg.

2. A power table saw as defined in claim 1, wherein said connection mechanism comprises an elongated axle.

3. A power table saw as defined in claim 2, wherein said axle is attached to opposite sides, and proximate a rear of said base so that said axle is arranged generally perpendicular to said blade, and said brackets are mounted on a bottom surface of said table top assembly generally above said axle, said extension table being configured to receive a workpiece from said table top downstream of said blade.

4. A power table saw as defined in claim 2, wherein said axle is attached to opposite sides, proximate another side, of said base so that said axle is arranged generally parallel to said blade, and said brackets are mounted on a bottom surface of said table top assembly generally above said axle, said extension table being configured to support a workpiece that extends beyond said table top assembly to one side of said blade.

5. A power table saw as defined in claim 4, wherein said extension table comprises:
   a first support arm having a first end configured to be removably attached to one of said brackets and a second end which is pivotally connected to a first connection joint provided on a first support frame;
   a second support arm spaced from said first support arm and having a first end configured to be removably attached to the other one of said brackets and a second end pivotally connected to a second connection joint provided on a second support frame; and
   an elongated first material support attached proximate said second ends of, and extending between, said first and second support arms, for supporting a workpiece that extends past said table top downstream of said blade.

6. A power table saw as defined in claim 5, wherein said extension table further comprises:
   a first support rod extending from said second end of said first support arm;
   a second support rod extending from said second end of said second support arm; and
   an elongated second material support attached proximate distal ends of, and extending between, said first and second support rods, for supporting a workpiece that extends past said first material support.

7. A power table saw as defined in claim 6, wherein said support arms comprises an elongated tube with a circular cross section.

8. A power table saw as defined in claim 5, wherein each of said first ends of said first and second support arms are removably attached to said brackets by a retaining pin.

9. A power table saw as defined in claim 5, wherein said first support frame comprises:
   a first upper leg having a first end pivotally connected to said axle provided in said base and a second end pivotally connected to said first support arm at said first connection joint;
   a first lower leg having a first end pivotally connected to said first support arm and said first upper leg at said first connection joint; and
   a first securing mechanism connected to said first upper leg and said first lower leg for releasably locking the first lower leg at a fixed angle with respect to said first upper leg; and
   wherein said second support frame comprises:
      a second upper leg having a first end pivotally connected to said axle provided in said base and a second end pivotally connected to said second support arm at said second connection joint;

a second lower leg having a first end pivotally connected to said second support arm and said second upper leg at said second connection joint; and a second securing mechanism connected to said second upper leg and said second lower leg for releasably locking the second lower leg at a fixed angle with respect to said second upper leg.

10. A power table saw as defined in claim 9, wherein said first and second support frames further comprise an adjustable feet attached to second ends of said first and second lower legs for raising and lowering said connection joint relative to a surface on which said feet are placed.

11. A power table saw as defined in claim 9 wherein said first and second support frames further comprise a collar provided at said first ends of said first and second upper legs and configured to be matingly and pivotally connected to said axle.

12. A power table saw as defined in claim 9, wherein said first and second support arms and said first and second lower legs are arranged to align generally parallel with said first and second upper legs in direction generally perpendicular to said blade when said extension table is folded and stored in said base.

13. A power table saw as defined in claim 1, wherein said extension table further comprises:
a first support rod extending from said second end of said first support arm;
a second support rod extending from said second end of said second support arm; and
an elongated second material support attached proximate distal ends of, and extending between, said first and second support rods, for supporting a workpiece that extends past said first material support.

14. A power table saw as defined in claim 13, wherein said support arms comprises an elongated tube with a circular cross section.

15. A power table saw as defined in claim 1, wherein each of said first ends of said first and second support arms are detachably connected to said brackets by a retaining pin.

16. A power table saw as defined in claim 1, wherein said first and second support frames further comprise an adjustable feet attached to said second ends of said first and second lower legs for raising and lowering said connection joint relative to a surface on which said feet are placed.

17. A power table saw as defined in claim 1, wherein said first and second support frames further comprise a collar provided at said first ends of said first and second upper legs and configured to be matingly and pivotally connected to said axle.

18. A power table saw as defined in claim 1, wherein said first and second support arms and said first and second lower legs are arranged to align generally parallel with said first and second upper legs in direction generally parallel to said blade when said extension table is folded and stored in said base.

19. A foldable extension table for a power table saw assembly that has a frame configured to house a motor assembly for driving a rotatable blade, a table top assembly provided on a top of the frame having a top surface with an opening through which the rotatable blade can extend, and a base provided on a bottom of said frame opposite the table top for supporting the frame on a top side of the base, said extension table comprising:
a first support arm having a first end configured to be removably attached to a first bracket secured underneath the table top and a second end pivotally connected to a first connection joint provided on a first support frame;
a second support arm spaced from said first support arm and having a first end configured to be removably attached to a second bracket spaced from and secured underneath the table top and a second end pivotally connected to a second connection joint provided on a second support frame; and
an elongated first material support attached proximate said second ends of, and extending between, said first and second support arms, for supporting a workpiece that extends past said table top;
wherein first and second frames are configured to be pivotally connected to an elongated axle fixedly secured to said base on a bottom side of said base opposite said top side; and
wherein said extension table is configured to be detached from said first and second brackets, folded and pivoted about said axle to be stored on the bottom side, below said base,
wherein said extension table further comprises:
a first support rod extending from said second end of said first support arm;
a second support rod extending from said second end of said second support arm; and
an elongated second material support attached proximate distal ends of, and extending between, said first and second support rods, for supporting a workpiece that extends past said first material support;
wherein said first support frame comprises:
a first upper leg having a first end pivotally connected to said axle provided in said base and a second end pivotally connected to said first support arm at said first connection joint;
a first lower leg having a first end pivotally connected to said first support arm and said first upper leg at said first connection joint; and
a first securing mechanism connected to said first upper leg and said first lower leg for releasably locking the first lower leg at a fixed angle with respect to said first upper leg; and
wherein said second support frame comprises:
a second upper leg having a first end pivotally connected to said axle provided in said base and a second end pivotally connected to said second support arm at said second connection joint;
a second lower leg having a first end pivotally connected to said second support arm and said second upper leg at said second connection joint; and
a second securing mechanism connected to said second upper leg and said second lower leg for releasably locking the second lower leg at a fixed angle with respect to said second upper leg.

20. A power table saw as defined in claim 19 wherein said first and second support frames further comprise a collar provided at said first ends of said first and second upper legs and configured to be matingly and pivotally connected to said axle.

21. A power table saw as defined in claim 19, wherein said axle is attached to opposite sides, and proximate a rear of said base so that said axle is arranged generally perpendicular to said blade, and said brackets are mounted on a bottom surface of said table top generally above said axle, said extension table being configured to receive a workpiece from said table top downstream of said blade; and
said first and second support arms and said first and second lower legs are arranged to align generally parallel with said first and second upper legs in direction generally parallel to said blade when said extension table is folded and stored in said base.

22. A power table saw as defined in claim 19, wherein said axle is attached to opposite sides, proximate another side, of said base so that said axle is arranged generally parallel to said blade, and said brackets are mounted on a bottom surface of said table top generally above said axle, said extension table being configured to support a workpiece that extends beyond said table top to one side of said blade; and said first and second support arms and said first and second lower legs are arranged to align generally parallel with said first and second upper legs in direction generally perpendicular to said blade when said extension table is folded and stored in said base.

* * * * *